United States Patent Office 3,484,950
Patented Dec. 23, 1969

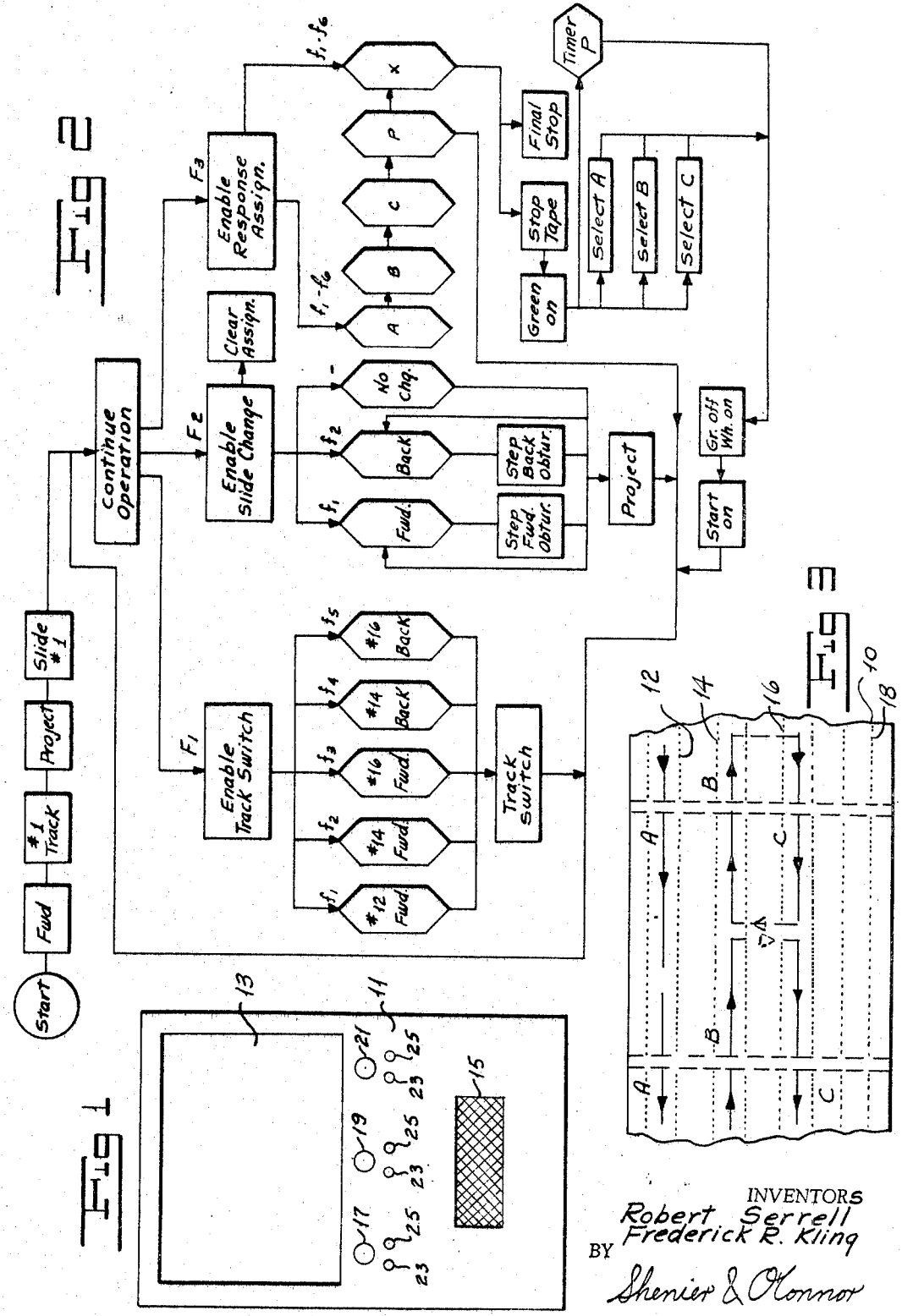

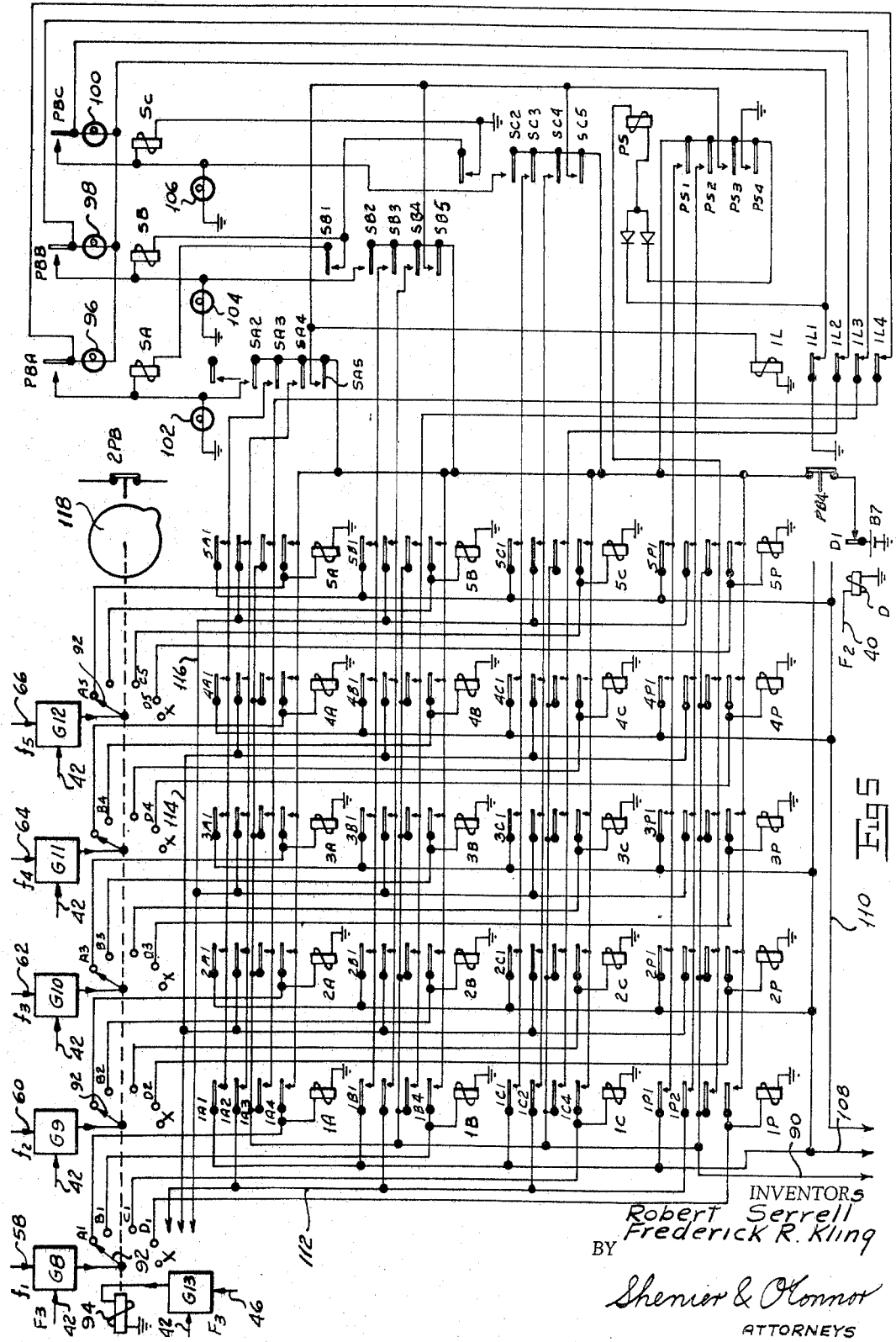

3,484,950
TEACHING MACHINE
Robert Serrell, Princeton, N.J., and Frederick R. Kling, Point Pleasant, Pa., assignors to Educational Testing Service, Princeton, N.J., a nonprofit corporation of New York
Continuation of application Ser. No. 560,620, June 27, 1966. This application June 12, 1968, Ser. No. 739,900
Int. Cl. G09b 7/06
U.S. Cl. 35—9                                23 Claims

ABSTRACT OF THE DISCLOSURE

A teaching machine for presenting a student with a program of instruction from a storage system comprising a record medium carrying a plurality of tracks of recorded information wherein the system contains a plurality of various program portions, each of which is continuous between response intervals. The machine includes means adapted to shift between tracks in the course of a program portion and without interruption thereof for presenting the program portion. At the end of a program portion student operable response means is activated to prompt the student to respond. His response determines the subsequent program portion. If no response is made within a certain time, a predetermined subsequent program portion is presented. The control means is responsive to ultrasonic enabling pulses on the information tracks, which pulses exist for a sufficiently long time to permit actuating pulses on a separate control track to perform the required operations.

---

This application is a continuation of our copending application Ser. No. 560,620, filed June 27, 1966, and now abandoned.

Our invention relates to a teaching machine and more particularly to a simple, versatile, automatic teaching machine which supplies simultaneous audible and visible instruction in a manner superior to teaching machines of the prior art.

There are known in the prior art various machines which are intended to instruct a student by presenting him with both visible information and audible instruction. Many of these machines are provided with means adapted to be operated by the student to indicate his answer to a question. Some of the machines are automatically programmed to present additional information or instruction following the making of a selection by the student. Machines of the prior art embody a number of defects in varying degrees.

Defects of teaching machines of the prior art fall generally into two classes. First, they have important limitations from the psychological standpoint. The response or selection system used by the machine in many cases is ambiguous. For example, where two pushbuttons are simultaneously operated, an erroneous response may be indicated. Most machines fail to supply the student any indication of the response chosen after he makes his selection. The action of the machine in providing the subsequent program section generally is variable and often is inordinately delayed. The delay may be occasioned by the necessity of locating information stored at a relatively remote point in a serial storage device such as a tape. These machines of the prior art fail to incorporate any means for prompting the student in the event that he fails to make a selection within a given period of time. Others may present erroneous information if a student makes a selection at a time when none is called for.

The defects outlined above exist for all users of the machine but they are particularly serious when the machine is to be used to instruct a child whose attention is difficult to hold and who will not comprehend ambiguous or confused operation of the machine.

A second class of defects which to some extent are allied with the defects outlined above, is physical defects of the machine itself. First, the machines generally require a computer for determining the program following the student's response, thus preventing economical use of the machines. The machines of the prior art fail to make efficient utilization of the serial storage device on which the program is recorded. One or more tapes must be rewound at the end of the machine program.

We have invented a teaching machine which overcomes the defects of teaching machines pointed out hereinabove. Our machine prevents ambiguous operation of the machine by the student. It permits visual association of each response pushbutton or the like with the relevant part of the picture presented. It provides the student with a visual indication of possible choices at a programmed stop. It affords a visual indication of the chosen response without interrupting the program. It is rapid in operation in avoiding a delay between student response and resumption of the program. It provides for automatic prompting of the student upon his failure to respond within a predetermined time. It permits rapid and expeditious presentation of alternative sequels in response to the student selection or failure to select. Our machine does not require an external computer for its operation. It is versatile and economical. It efficiently utilizes a serial recording means.

One object of our invention is to provide a teaching machine which overcomes defects of teaching machines of the prior art.

Another object of our invention is to provide a teaching machine which is rapid and expeditious in operation.

A further object of our invention is to provide a teaching machine which automatically presents one of a number of alternative sequels in response to a respective student selection or failure to select.

Still another object of our invention is to provide a teaching machine which automatically prompts a student to respond if he has not done so within a predetermined time after an answer is called for.

A still further object of our invention is to provide a teaching machine which is simple and relatively inexpensive.

Yet another object of our invention is to provide a teaching machine which makes efficient use of a serial storage device.

Other and further objects of our invention will appear from the following description.

In general our invention contemplates the provision of a teaching machine for providing a student with an uninterrupted visual and audible program, the sequences of which are automatically determined by respective preset combinations of operative track and tape direction in response to student selections or failure to select within an allotted time period.

In the accompanying drawings which form part of the instant specification and which are to be read in conjunction therewith and in which like reference numerals are used to indicate like parts in the various views:

FIGURE 1 is a partially schematic view of one form of our teaching machine as viewed by a student.

FIGURE 2 is a logic diagram illustrating generally the operation of our teaching machine.

FIGURE 3 is a fragmentary diagrammatic view illustrating the information and control medium of our teaching machine.

FIGURE 5 is a schematic view illustrating the details of the remainder of the circuitry of our teaching machine.

Figure 4:
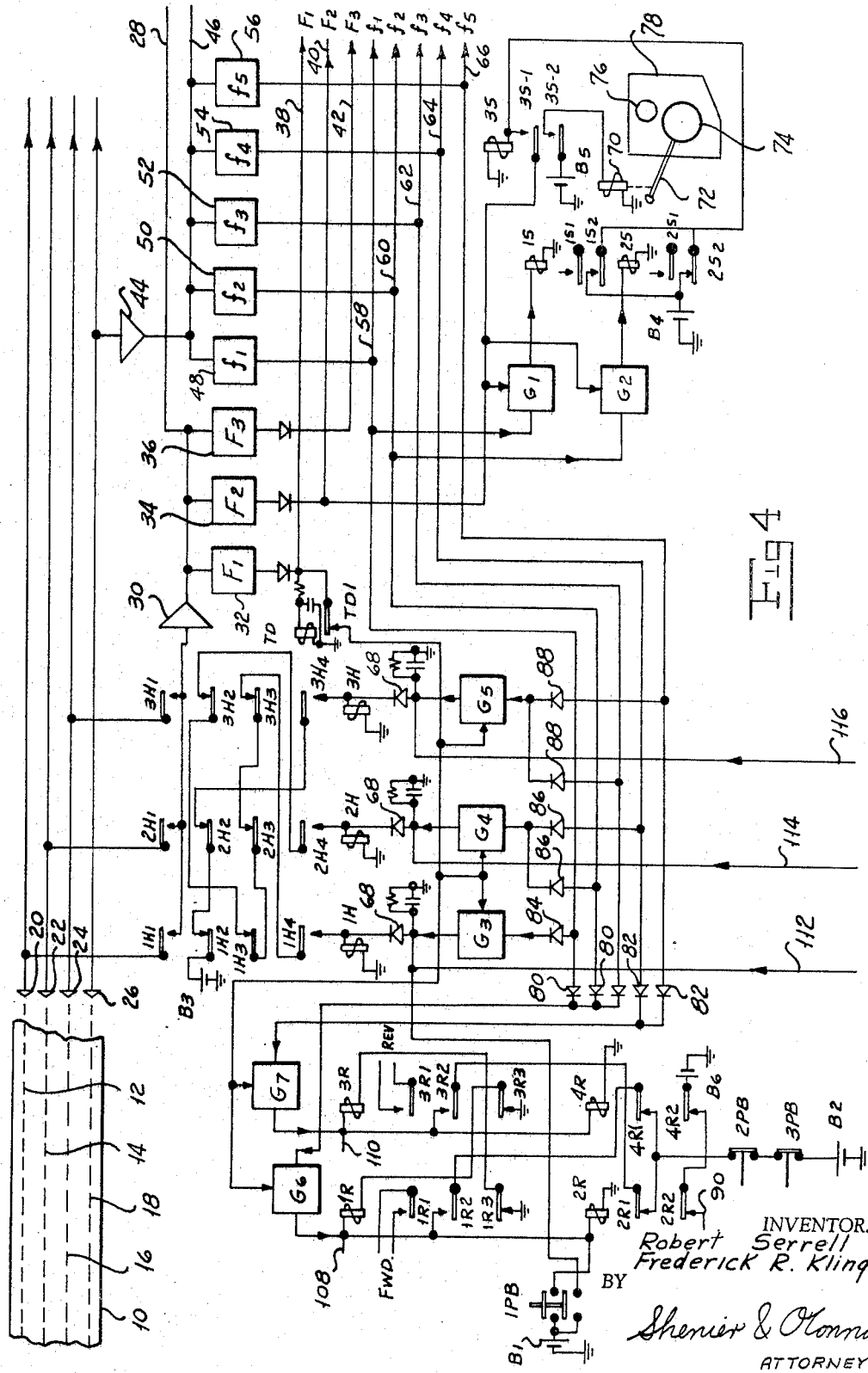
FIGURE 4 is a schematic view illustrating the details of a portion of the circuitry of our teaching machine.

Referring now to the drawings, our machine may include a cabinet 11 provided with a viewing screen 13 upon which the pictures to be presented to the student are projected by any suitable apparatus, known to the art, having provision for automatically changing slides in either a forward or a backward direction. Cabinet 11 is also provided with a speaker 15 through which the audible instructions are broadcast. Respective pushbuttons 17, 19 and 21 are adapted to be actuated by the student at such time as an answer is called for. Associated with each pushbutton is a white light 23 and a green light 25. While the lights have been separately illustrated in FIGURE 1, it will readily be appreciated that we may, if desired, use lights which are mounted behind translucent buttons. The buttons may be positioned at locations corresponding to respective sections of the screen 13 so as to be associated with various parts of the picture.

The information and control carrying medium of our machine may, for example, be a tape 10 on which information is recorded in a plurality of tracks. In one embodiment of our machine we provide three tracks of recorded information and one track carrying control signals which are adapted to activate the various parts of the apparatus. Superimposed on the information tracks are signals of ultrasonic frequencies $F_1$, $F_2$ and $F_3$ at locations at which certain control operations are to take place. For example, a signal of frequency $F_1$ may be employed to initiate a track switch operation; a signal of frequency $F_2$ may be used to enable the slide change mechanism; and a frequency $F_3$ may be employed to enable the response assignments section depending upon the response made. At appropriate locations on the control track are pulses or beeps for performing the actual control operations. We may use by way of example any frequencies of $f_1$ to $f_6$. These beeps or pulses are used to perform various control operations during an enabling period corresponding to a signal of one of the frequencies $F_1$ to $F_3$.

Our machine provides different subsequent program portions depending upon the choice made by the student or his failure to select when a selection is called for. If, for example, the machine is started and is proceeding along a voice track such as track 12 on the tape 10, at a point indicated by the broken lines in FIGURE 3, the tape stops and a selection is called for. If at that point the student selects response A, the system will continue along track 12. If, however, the student at that point chooses response B, the apparatus switches to track 14, proceeds backwardly on that track, then switches to track 16 and continues forwardly on that track. When such a selection is made the student may be presented with a repetition of the passage he has just heard but with certain audible and visible variations. If response C is chosen, the apparatus may proceed forward on track 16 and then backwardly on track 14 to the same stop. This may give him additional or corrective information. It will readily be appreciated that, owing to the fact that there are two voice track loops between consecutive stops, each of which occupies two tracks for half the length of the tape between stops, the three voice tracks are fully and efficiently utilized, as contrasted with systems of the prior art. Our apparatus also is capable of merging two or more program portions together while the tape is in motion. This is readily achieved by switching from one track to another without any reversal of direction. Thus we provide a large variety of branching patterns.

Referring to FIGURES 4 and 5 in one specific embodiment of our invention, four reading heads 20, 22, 24 and 26 are associated respectively with tracks 12, 14, 16 and 18 which are indicated by broken lines in FIGURE 4. Each of the tracks 12, 14 and 16 carries an audio signal as well as ultrasonic signals of frequencies $F_1$, $F_2$ and $F_3$. As has been explained, the signal $F_1$ is a track switch enabling signal, the signal $F_2$ is a slide change enabling signal and the signal $F_3$ is an enabling signal for the response assignments and the tape stop. The fourth or control track 18 is provided with groups of "beeps" of respective frequencies $f_1$, $f_2$, $f_3$, $f_4$ and $f_5$ depending upon the operations which are to take place during the period of an enabling signal.

We connect the three heads 20, 22 and 24 associated with the voice tracks to respective normally open relay switches 1H1, 2H1 and 3H1 which are selectively operated to connect one of the heads to a conductor 28 through an amplifier 30. Respective filters 32, 34 and 36 apply enabling signals of frequencies $F_1$, $F_2$ and $F_3$, respectively, through diodes to conductors 38, 40 and 42.

An amplifier 44 connects head 26 associated with the control track to a conductor 46. Respective filters 48, 50, 52, 54 and 56, are responsive, respectively, to frequencies $f_1$ to $f_5$, and couple signals of these frequencies, respectively, to conductors 58, 60, 62, 64 and 66.

To start the apparatus a pushbutton switch 1PB is adapted to be operated to connect a battery B1 to energize respective relay windings 1R and 2R. The circuit for winding 1R is completed through a switch 3R3 while the circuit for winding 2R is connected directly to ground. In response to these operations, switch 1R1 closes to complete the forward drive circuit for the tape motor. Switch 1R2 closes to complete a holding circuit for winding 1R through switch 1R2, switch 4R1, a normally closed cam operated switch 2PB and a stop switch 3PB to a battery B2. Thus, when the switch 1PB is released, winding 1R remains energized. Concomitantly with the operations just described, switch 1R3 opens to disable the reverse tape motor drive control relay 3R.

Energization of the winding 2R opens switch 2R1 to disable the holding circuit for winding 3R and further opens switch 2R2 to disable conductor 90.

When the above actions take place, the tape begins to move in the forward direction. At the same time actuation of switch 1PB applies a signal to the head control relay winding 1H through a diode 68 to energize the winding. In response to energization of the winding 1H, switch 1H1 closes to connect the head associated with the first track to conductor 28. At the same time, switches 1H2 and 1H3 open to interrupt the holding circuits for the relay windings 2H and 3H associated with the heads corresponding to the second and third tracks on the tape. Switch 1H4 also closes to complete a holding circuit for winding 1H through switches 3H3 and 2H3 to a battery B3. Thus, it will be seen that the first head is connected to conductor 28 at the same time as the tape is driven in the forward direction when the start button is operated. Under these conditions, the first slide is projected on the screen and the audio signal on the first track is broadcast to the student.

In the course of the first part of the program various slides may be presented to the student. The system is so arranged as to present any one of the next slides in the forward or backward direction of movement of the slide change mechanism. This is achieved by an ultrasonic slide change enabling signal $F_2$ on the voice track presently being used. This signal lasts as long as is required to effect the desired changes. The voices signal may be superimposed upon this control signal. The change itself is effected by a number of pulses of one frequncy on the control track within the period of the enabling signal. Each pulse produces a change of one slide. The arrangement is such that if a pulse has a frequency $f_1$ the next slide in the forward direction is presented while if the pulses have a frequency $f_2$, the next slide in the backward direction is presented.

Assuming that track 1 which is now in use carries an ultrasonic signal of frequency $F_2$ indicating that a slide changing operation is to take place, this signal is applied to the control terminal of respective gating circuits G1 and G2. These circuits are provided with inputs from conductors 58 and 60 which are supplied respectively with control signals of frequencies $f_1$ and $f_2$. As has been explained, signals $f_1$ cause the slide change mechanism to move the next slide in the forward direction into view while signals of frequency $f_2$ present the next slide in the backward direction. As many slide changes, up to five, will occur as there are signals of frequencies $f_1$ and $f_2$. If a signal $f_1$ is present during the enabling signal $F_2$, gate G1 passes the signal to slide change relay winding 1S to close switch 1S1 to actuate the slide change mechanism (not shown) to change one slide in the forward direction. At the same time switch 1S2 closes to connect a battery B4 to an obturator actuating relay winding 3S. This action closes switch 3S1 to hold relay winding 3S energized after the signal $f_1$ disappears and for as long as the enabling signal $F_2$ lasts. Winding 3S also closes switch 3S2 to energize a solenoid winding 70 to swing the obturator arm 72 carrying a blocking element 74 to a position at which it closes the projection opening 76 in the slide mechanism housing 78. At the end of the enabling signal $F_2$ winding 3S is deenergized. Upon the occurrence of pulses $f_2$ during the period of the slide change enabling signal $F_2$, each pulse is coupled by gate G2 to a winding 2S to close a first switch 2S1 to cause the slide change mechanism to put the next slide in the backward direction in viewing position and to close a switch 2S2 to operate the obturator mechanism in the manner described above in connection with the pulse $f_1$.

Our apparatus is so arranged as to permit switching between tracks in the course of any section of the program. As has been explained, we employ an ultrsonic enabling signal of frequency $F_1$ on conductor 38 to achieve this resuit. When the voice track presently being used contains such a signal, it is applied through a time delay relay switch TD1 adapted to be opened by a time delay relay winding TD to the control input terminals of gates G3, G4 and G5, as well as to the control input terminals of gates G6 and G7. A group of diodes 80 connect conductors 58, 60 and 62 corresponding to control signals of frequencies $f_1$, $f_2$ and $f_3$ to the signal input terminal of gate G6, the signal output terminal of which is connected to winding 1R. Two diodes 82 connect the conductors 64 and 66 carrying control signals of frequencies $f_4$ and $f_5$ to the signal input terminal of gate G7, the signal output terminal of which is connected to winding 3R. A diode 84 connects conductor 58 to gate G3 which is adapted to couple a signal to winding 1H through diode 68. Two diodes 86 connect conductors 60 and 64 to gate G4 which is adapted to couple a signal to winding 2H through a diode 68. Respective diodes 88 connect conductors 62 and 66 to gate G5 which is adapted to couple signals to winding 3H through a diode 68.

The arrangement of diodes just described permits a number of track switching and tape drive functions during the occurrence of a track switch enabling signal. A signal $f_1$ energizes the head 20 corresponding to track 12 and causes the tape to run in a forward direction. A signal $f_2$ energizes head 22 corresponding to track 14 and causes the tape to run in a forward direction. A signal of frequency $f_3$ energizes the head 24 corresponding to the third track 16 and causes the tape to run forward. A signal of frequency $f_4$ energizes head 22 corresponding to the second track 14 and causes the tape to run backward. A signal corresponding to frequency $f_5$ energizes the head 24 corresponding to the third track and causes the tape to run backward.

While the operations described above will be apparent from the arrangement shown in the drawing, for purposes of demonstration it will be assumed that head 20 is energized, that the tape 10 is running in the forward direction and, further, that a control signal $f_5$ occurs during the period of a track switch enabling signal $F_1$ on track 12. The signal $F_1$ enables all of the gates G3, G4, G5, G6 and G7. A signal of frequency $f_5$ is applied by a diode 88 to the signal input of gate G5 and is coupled by the gate to winding 3H through a diode 68. Winding 3H thus is energized to close its switch 3H1 to connect head 24 to conductor 28 through amplifier 30. At the same time switch 3H2 opens to interrupt the holding circuit associated with winding 2H. Switch 3H3 opens to interrupt the holding circuit associated with winding 1H to deenergize head 20. Switch 3H4 closes to complete the holding circuit for winding 3H through switches 3H4, 2H2 and 1H2 to B3. Thus, switching has effectively been achieved from head 20 to head 24.

The signal of frequency $f_5$ is applied by diode 82 to the signal input terminal of gate G7 which applies the signal to winding 3R. When that occurs, switch 3R1 closes to energize the reverse drive circuit of the tape mechanism (not shown). Concomitantly, switch 3R2 closes to complete a holding circuit for winding 3R through switches 3R2, 2R1, 2PB and 3PB to B2. Moreover, switch 3R3 opens to prevent energization of the forward drive relay winding 1R. The signal from gate G7 also energizes winding 4R to open switch 4R1 to interrupt the holding circuit of winding 1R and also opens switch 4R2 to disconnect battery B6 from conductor 90.

As the tape 10 approaches a position at which the section of a program is to end, our apparatus automatically sets itself up for the next program section depending upon the answer made by the student. As the stopping point is reached, an ultrasonic enabling signal of frequency $F_3$ appears on the voice track now in use and is applied to line 42 by filter 36. We apply this signal to the control terminals of a plurality of respective gates G8 to G12, each of which is associated with the switch arm 92 of one bank of a five-bank stepping switch. All the arms 92 are ganged for movement in steps in response to energization of a solenoid winding 94 which is operated by a gate G13, which is enabled by the signal on line 42. Each arm 92 sequentially engages four contacts. For example, the switch arm 92 associated with gate G8 sequentially engages contacts A1, B1, C1 and P1. Similarly, the respective arms associated with the other gates G9 to G12, sequentially engage their contacts. We connect the respective conductors 58, 60, 62, 64 and 66 to the signal input terminals of gates G8 to G12 and connect the outputs of the gates to the arms 92 respectively. Thus, each gate is responsive to one of the control signal frequencies $f_1$ to $f_5$. Conductor 46 supplies all these frequency signals to the input of gate G13.

We provide one relay winding for each of the stepping switch contacts. For example, relay windings 1A, 1B, 1C and 1P are energized in response to the application of a signal to the corresponding contact A1, B1, C1 and P1. The remaining relays associated with the various contacts can readily be seen from the drawing and will not be described in detail to avoid prolixity. We provide each of the assignment relay windings designated by the letters A, B and C preceded by one of the numerals 1 to 5 and the prompting relay windings designated by the letter P and preceded by one of the numerals 1 to 5 with four normally open switches adapted to be closed in response to energization of the corresponding winding. By way of example, there are four normally open switches 1A1 to 1A4 associated with winding 1A.

The selecting section of our apparatus includes three selecting pushbuttons PBA, PBB and PBC adapted to be actuated by the student when a selection is to be made. A plurality of normally closed switches 1L1 to 1L4 adapted to be opened upon energization of a winding 1L provide circuits for energizing green lamps 96, 98 and 100 when the tape stops and a selection is to be made. Respective white lamps 102, 104 and 106 are adapted to be lighted in response to operation of a respective pushbutton PBA, PBB or PBC. We provide relay windings SA, SB and SC associated with the pushbuttons PBA, PBB and PBC. Each of the windings SA, SB and SC has a normally closed switch and four normally open switches adapted to be actuated in response to energization of the winding. For example, winding SA when energized opens a normally closed switch SA1 and closes four normally open switches SA2 to SA5.

As has been explained we so interconnect the assignment setup relay windings and the selection circuitry as to provide the desired program following operation of one of the selecting pushbuttons. Each of the first relay switches, such as switch 1A1, of all of the relay windings designated by the letters A, B, C and P, such as relay winding 1A, connects either a conductor 108 which is connected to winding 1R or a conductor 110 which is connected to winding 3R to one of the normally open switches, such as the switch SA3 of one of the relay windings SA1, SA2, SA3 or PS. Each of the second switches, such as the switch 1A2 of the relay windings designated by letters A, B, C and P, when closed connects one of three conductors 112, 114 and 116 to another normally open switch such as switch SA4 of one of the SA, SB, SC or PS windings. We connect conductors 112, 114 and 116 to the input diodes 68 of the respective windings 1H, 2H and 3H. Switches PBA, PBB and PBC of FIGURE 5 correspond to buttons 17, 19 and 21 of FIGURE 1.

From the connections just described, as the end of a program section is approached, our system can be set up for any one of five possible arrangements when a selection is made. Track 12 may be used with the tape running forward; track 14 may be used with the tape running either forward or backward; and track 16 may be used with the tape running either forward or backward. The third normally open switch of each of the response assignment relays designated by the letters A, B and C is adapted to connect line 90 to one of the normally closed switches 1L2, 1L3 and 1L4 associated with winding 1L. All of the P3 switches are adapted to connect line 90 to the time delay relay windings PS. Line 90 is itself connected to battery B6 through windings 2R2 and 4R2 when the tape drive is deenergized. All of the fourth switches of the response assignment and prompt relays when closed provide holding circuits for their associated windings through a clearing pushbutton switch PB4 and through a disabling switch D1 to a battery B7. A winding D energized by a signal on conductor 40 is adapted to open switch D1 at a time to be described.

The arrangement of our response assignment and selection arrangement can best be understood by assuming a particular example. As the end of a section of the program is approached, the track in use puts out an enabling signal of a frequency $F_3$. During the period of that signal five "beeps" of the various frequencies $f_1$ to $f_5$ occur in a sequence which will result in the desired response assignment. The first four of these beeps are employed to set up the proper response assignments for the three choices and the response assignment if a choice is not made within the allotted time. By way of example, we will assume that during the period of the signal of frequency $F_3$ a series of beeps of successive frequencies $f_2$, $f_5$, $f_4$, $f_1$, and $f_3$ occur. As has been explained hereinabove, the enabling signal enables all of the gates G8 to G13. With the switch arms 92 in engagement with the A1 switch contacts, the first pulse $f_2$ passes through gate G9 to energize winding 2A to close its associated contacts. Switch 2A1 connects switch SA3 to conductor 108 corresponding to a forward drive of the tape. Switch 2A2 connects switch SA4 to line 114 which corresponds to the second track on the tape. Switch 2A3 connects line 90 to switch 1L4. It will be remembered that line 90 will be connected to battery B6 when the tape drive stops. Switch 2A4 closes to complete the holding circuit for winding 2A through a "clear" pushbutton switch PB4 and through a normally closed switch D1 to battery B7.

At the end of the first beep the switch arms 92 move into engagement with the B contacts. The next beep of frequency $f_5$ passes through gate G12 to energize winding 5B to close its switches. Switch 5B1 connects switch SB3 to line 110 corresponding to reverse drive of the tape. Switch 5B2 connects switch SB4 to line 116 corresponding to the third track. Switch 5B3 connects line 90 to switch 1L3. Switch 5B4 completes the holding circuit for winding 5B. At the end of this second beep arms 92 move into engagement with the C contacts.

Gate G11 passes the next beep of frequency $f_4$ to energize winding 4C which closes its switches. Switch 4C1 connects switch SC3 to line 110 corresponding to the reverse movement of the tape. Switch 4C2 connects switch SC4 to line 114 corresponding to the second track while switch 4C3 connects line 90 to switch 1L2 and switch 4C4 provides the holding circuit for winding 4C. Arms 92 then move into engagement with the P contacts.

The fourth beep of frequency $f_1$ passes through gate G8 to energize 1P to close switch 1P1 to connect PS1 to the forward drive line 108 to close switch 1P2 to connect switch PS2 to the first track line 112 to close switch 1P3 to connect line 90 to the time delay prompting relay winding PS. Following the fourth beep, arms 92 move into engagement with contacts designated as X which are not connected into the circuitry of our system. The fifth beep of the group, which may be of any frequency since it is not applied to the circuitry, causes arms 92 to move from the X contacts back into engagement with the A contacts. In the course of this movement, a cam 118 on the switch shaft opens switch 2PB to interrupt the holding circuit provided by the switch to stop the tape drive. When that occurs, power is applied to line 90 by switches 2R2 and 4R2 from battery B6. Green lamps 96, 98 and 100 associated with the selecting pushbuttons PBA, PBB and PBC are lighted through, for example, switch 2A3 and switch 1L4 to lamp 96 and through 1L1 to ground.

The apparatus is now in condition to permit a selection to be made. The following response assignments have been set up. Should the student make choice A, the tape will begin to move in the forward direction and the second track pickoff will be energized. If choice B is made, the tape moves in the reverse direction and the third track pickoff is energized. Selection of choice C causes the tape to be driven in the reverse direction and the second track pickoff to be energized. If the student fails to make a selection within the time delay provided by the relay PS, the tape will be driven in the forward direction and the first track will be employed. The apparatus is now ready for the student to make a selection.

Assuming that the student pushes PBA, relay winding SA is energized through switches SB1 and SC1. Owing to that arrangement, only one button at a time can register the selection. If two buttons are pushed only the circuit of one will be complete. For example, if both PBA and PBB are actuated, only the circuit of SB will be completed. Energization of winding SA closes switch SA2 to provide a holding circuit for winding SA through PB4 and D1 to B7. At the same time the white lamp 102 associated with PBA is illuminated to register the selection. Similar lamps 104 and 106 are associated with switches PBB and PBC.

Switch SA3 closes to apply power from B7 to relay 1R to energize the forward drive of the tape. Switch SA4 closes to apply power from B7 to line 114 to energize the second track pickoff. Switch SA5 closes to apply power from B7 to winding 1L.

Energization of winding 1L opens switch 1L1 to disable winding PS. At the same time switch 1L4 opens to disconnect line 90 to extinguish the lamp 96. It will be appreciated that winding 1L, when energized also extinguishes green lights 98 and 100. As soon as the tape drive circuit is established, one of the switches 2R2 or 4R2 opens to remove the power from line 90. Upon the occurrence of the first slide change enabling signal of frequency $F_2$ winding D is energized to open switch D1 to reset the system. Its operation then continues in the manner described above. The result of a selection of the B or C choice, as well as of the operation of PS if no choice is made, can be followed through in the manner described.

The general operation of our apparatus can most easily be understood by reference to the logic diagram of FIGURE 2. Beginning with the circle labeled "Start" in the upper lefthand corner of the figure, the apparatus first proceeds forwardly on track 12 and the first slide is projected. This operation continues until a signal of frequency $f_2$ appears on the information track in use to indicate that a slide changing operation is to take place. At the same time there may exist on the control track a series of beeps of frequency $f_1$ or of frequency $f_2$. Each beep causes the slide change mechanism to change one slide forward if the frequency is $f_1$ or to cause it to change one slide rearwardly if the frequency is $f_2$. Beeps of both frequencies actuate the obturating mechanism.

When a signal of frequency $F_1$ appears on the information track in use, the track switch mechanism is enabled. At the same time a beep of one of the frequencies $f_1$ through $f_5$ exists. These frequencies correspond, respectively, to track 12 in a forward direction, track 14 in a forward direction, track 16 in a forward direction, track 14 in a backward direction and track 16 in a backward direction, and cause those conditions of active track and track direction to exist, as has been described.

The slide change and track switching operations are performed at various times until the end of a portion of the program is approached. At that time there appears on the track is use a signal of frequency $F_3$ for enabling the response assignments, or program portions to be provided when a response is made or after a failure to respond after a period of time. During the period of the signal $F_3$ a series of pulses of frequencies $f_1$ to $f_6$ exist to set up the assignments following the making of a response or following a period of time during which no response is made. If a selection is made or if none is made within an allotted period of time, the tape is restarted. As the tape stops, the green lamp 25 is lit under each assigned response button. When any assigned button is pressed, a white light 23 is lit and all the green lights are extinguished. The white light is extinguished by the next slide change enabling signal of frequency $F_2$. A pulse of frequency $f_6$ appearing on conductor 46 will step the switch having arms 92 while leaving the corresponding response means unassigned.

While we have described our system as including slide change mechanism for successively presenting projections of various slides in response to signals, we contemplate using such signals to actuate any suitable mechanism for changing the view presented. For example, we may use the signals to step a film strip carrying frames corresponding to the information to be presented visually.

We have termed frequencies $F_1$, $F_2$ and $F_3$ as "ultrasonic" frequencies to distinguish them from the control signal frequencies $f_1, f_2 \ldots f_6$. In practice we employ frequencies $F_1$, $F_2$, $F_3$ at the high end of the audio range of from about 5 to about 10 kc. We prefer to use these frequencies since they are easier to reproduce from tape than are truly ultrasonic frequencies above about 20 kc. or so. We filter these frequencies out of the signal reaching the loudspeaker.

It will be seen that we have accomplished the objects of our invention. We have provided a teaching machine which overcomes defects of teaching machines of the prior art. It is unambiguous in operation. It prompts a student upon his failure to make an answer within a period of time after an answer is called for. It makes efficient use of a serial storage device. Our machine provides the student with preselected response assigned programmed portions without delay following a selection or failure to select. It does not require an external computer for its operation.

It will be understood that certain features and sub-combinations are of utility and may be employed without reference to other features and subcombinations. This is contemplated by and is within the scope of our claims. It is further obvious that various changes may be made in details within the scope of our claims without departing from the spirit of our invention. It is, therefore, to be understood that our invention is not to be limited to the specific details shown and described.

Having thus described our invention, what we claim is:

1. A teaching machine for presenting a student with a program of instruction made up of an initial portion and a stop response interval and a subsequent portion selected from among various subsequent portions, each portion comprising audible material and visible material in the form of frames, the audible material in each of said portions being continuous from a start to a stop response interval including in combination a record medium carrying a pair of information tracks containing audible material and enabling signals at predetermined locations thereon, said enabling signals being present together with said audible material on said record medium between the start and a stop interval of a program portion, said medium carrying a control track having actuating signals at locations corresponding to the locations of said enabling signals, energizable program presenting means for presenting said program portions, means responsive to the concomitant presence of a first enabling signal and an actuating signal for switching between said information tracks in the course of a program portion without interruption thereof, means responsive to the concomitant presence of a second enabling signal and an actuating signal for changing frames in the course of a program portion without interruption thereof, means for energizing said presenting means to present said initial program portion, response assignment means for setting said presenting means to present various subsequent program portions, and means responsive to the concomitant presence of a third enabling signal and an actuating signal for actuating the said response assignment means, said response assignment means comprising student operable selecting means for determining the particular subsequent program portion presented.

2. A machine as in claim 1 including time delay means for actuating said presenting means to present a particular subsequent portion in the absence of an operation of said student operable means within a predetermined time period after actuation of said response assignment means.

3. A machine as in claim 1 in which longitudinally contiguous lengths of said information tracks carry respective parts of a single program portion.

4. A teaching machine for presenting a student with a program of instruction from a storage system comprising an elongated record medium carrying a plurality of independent tracks of recorded information extending in the direction of the length of said medium, said program containing an initial program portion in one of said tracks, a plurality of different subsequent program portions in said tracks, and a response interval between said initial program portion and said subsequent program portions, at least one of said subsequent program portions being on a plurality of said tracks, at least one of said tracks containing parts of more than one of said subsequent program portions, including in combination, energizable program presenting means for presenting a program from said storage system, said program presenting means comprising information reading means adapted to be actuated to read information from the respective tracks, means for moving said record medium and said reading means in the direction of the length of said record medium during said program portions, means for deactivating said moving means at the end of a program portion to provide said response interval, means for selectively and variably shifting said reading means among said independent tracks in the course of a program portion and without interruption of said relative motion, means for energizing said presenting means to present said initial program portion and respective means selectively operable by a student during said response interval selectively to present one of said subsequent program portions.

5. A machine as in claim 4 in which one of said program portions contains intelligible information recorded in one direction on one of said tracks and in the reverse direction in another of said tracks and in which said presenting means comprises means for concomitantly shifting said reading means between said tracks and changing the direction of said relative movement of said medium and said reading means in the course of a program portion without interruption thereof.

6. A machine as in claim 4 in which one of said program portions contains intelligible information recorded in one direction on one of said tracks and in the reverse direction in another of said tracks and in which said storage system comprises a series of frames of visual information and in which said presenting means comprises means for concomitantly switching said reading means between said tracks and changing the direction of said relative movement of said medium and said reading means in the course of a program portion without interruption thereof, and in which said presenting means further comprises means for selectively changing said frames in the forward or backward direction of said series during a program portion without interruption thereof.

7. A machine as in claim 4 wherein said student operable means is normally inoperative and means responsive to the end of said initial program portion for rendering said selecting means operative.

8. A machine as in claim 4 including means for automatically actuating said presenting means at a predetermined time after said deactivation of said moving means at the end of said program portion in the absence of an operation of said selecting means.

9. A machine as in claim 4 in which said storage system comprises a plurality of frames of visual information and in which said presenting means comprises means for automatically changing said frames in the course of a program portion without interruption thereof.

10. A machine as in claim 4 in which said storage system comprises a series of frames of visual information and in which said presenting means comprises means for selectively changing a plurality of frames in the forward or backward direction of said series in the course of a program portion without interruption thereof.

11. A machine as in claim 4 in which said record medium carries a control track and in which said presenting means comprises normally disabled actuatable means for producing a control operation, one of said information tracks carrying an enabling signal, said control track carrying an actuating signal during the period of said enabling signal.

12. A machine as in claim 11 in which said information track carries an audio signal and in which said enabling signals are effectively ultrasonic signals.

13. A machine as in claim 4 including means for indicating that a selection is to be made.

14. A machine as in claim 13 including means for indicating that selection which has been made.

15. In a teaching machine having a projection system provided with actuatable frame-changing mechanism and having a playback system provided with a reversible drive and with actuatable means for switching between tracks on a record medium, a record medium carrying a program existing continuously from a start to a stop response interval, means for actuating said projection and playback systems to present said program, means for actuating said frame-changing mechanism, means for actuating said track switching mechanism, said record medium having a plurality of tracks comprising an information track carrying an enabling signal existing for a period during which one of said frame-changing operations and said track switching operations is to take place, means responsive to said enabling signal for enabling one of said frame-changing and track switching actuating means, said record medium having a control track distinct from said information track carrying an actuating signal during said period and means for applying said actuating signal to the enabled actuating means.

16. A machine as in claim 15 in which said enabling signal is of a first frequency for a track switching operation and is of a second frequency for a frame changing operation.

17. A machine as in claim 15 in which said actuating signal is of a first frequency for a forward frame change and is of a second frequency for a backward frame change.

18. A machine as in claim 15 in which the frequency of said actuating signal corresponds to the track selected and the direction of said drive.

19. A machine as in claim 15 in which said program comprises an initial portion and diverse subsequent portions, selecting means adapted to be operated at the end of said initial portion, response assignment means for setting said playback system for said subsequent portions in accordance with the operation of said selecting means, said record medium information track having a response assignment enabling signal adjacent the end of said initial program portion and said control track having an actuating signal for operating said response assignment means.

20. A machine as in claim 19 in which said control track carries a plurality of successive respective actuating signals of different frequencies, the order of said actuating signals determining the relationship between said selecting means and said subsequent program portions.

21. A teaching machine for presenting a student with a program of instruction from a storage system comprising an elongated record medium carrying a plurality of independent tracks of recorded information extending in the direction of the length of said medium, said system containing an initial program portion and a plurality of various subsequent program portions each of which is continuous between response interval stops of the record medium including in combination, multi-track forward and backward playback means associated with said record medium, means for moving said record medium relative to said playback means in the direction of the length of said medium, means for selectively and variably switching said playback means amoung said independent tracks in the course of said relative movement, said record medium comprising an active track carrying enabling signals, first means responsive to a first enabling signal for controlling said track switching means, second means responsive to a second enabling signal for controlling said moving means to provide a response interval, respective means selectively operable by a student in said response interval for actuating the said playback means selectively to present one of said subsequent program portions, and third means responsive to a third enabling signal on said active track for variously assigning said program portions to the student operable means.

22. A machine as in claim 21 including means operable automatically to actuate said playback means in the absence of operation of said selecting means in said response interval.

23. A machine as in claim 21 including a visual display and means mounting said student operable means in spatially associated relationship with various parts of said display.

References Cited

UNITED STATES PATENTS

| | | | |
|---|---|---|---|
| 2,514,578 | 7/1950 | Heller et al. | 179—100.2 |
| 3,269,033 | 8/1966 | Redfield et al. | 35—35 |
| 3,141,243 | 7/1964 | Chapman et al. | 35—9 |
| 3,269,033 | 8/1966 | Redfield et al. | 35—35 |
| 3,383,781 | 5/1968 | Diuzet | 35—9 |
| 3,395,464 | 8/1968 | Leslie et al. | 35—9 |
| 3,408,749 | 11/1968 | Brudner | 35—9 |
| 2,787,669 | 4/1957 | Flan et al. | 35—8.1 |
| 3,194,895 | 7/1965 | Treadwell | 35—8.1 |
| 3,294,924 | 12/1966 | Fein | 35—8.1 |

EUGENE R. CAPOZIO, Primary Examiner

W. W. NIELSEN, Assistant Examiner